UNITED STATES PATENT OFFICE.

LOUIS KAPPLER, OF WOODSTOCK, ILLINOIS.

IMPROVEMENT IN MEDICAL COMPOUNDS OR BITTERS.

Specification forming part of Letters Patent No. 145,062, dated December 2, 1873; application filed November 4, 1873.

*To all whom it may concern:*

Be it known that I, LOUIS KAPPLER, of Woodstock, in the county of McHenry and State of Illinois, have invented a Medical Compound, called the "Mount ten Root Bitters," to be used as a laxative, liver-cleaning, blood-purifying, and system-strengthening medicine, of which the following is a specification:

The nature of my invention consists in mixing certain ingredients, mostly roots, in certain proportions, which are first boiled with water for extracting their medical properties, which extract, for better preservation, is mixed with alcohol or whisky, to be taken in the shape of bitters.

To prepare said bitters, I take one ounce of agaric or touchwood, one ounce of aloes, one ounce of zedoary root, one ounce of gentian, one ounce of arum or dragon root, one dram of rheum or rhubarb, one ounce of ligusticum levisticum or lovage, two ounces of glycyrrhiza or licorice, thirty grains of castoreum, and one-half ounce of theriac or theriaca.

The above ingredients I put into a gallon of water. I set it over a slow fire, and let it boil until reduced to one-half of its volume, and after sufficiently cooled it is to be filtered, and the thus-prepared extract is to be mixed, for better preservation, with whisky or alcohol, and filled into bottles ready for use.

This bitters may be taken in quantities from a tea-spoonful to a small wine-glassful, in proportion to its strength, the age of the person, or to the degree of sickness.

What I claim as my invention, and desire to secure by Letters Patent, is—

The herein-described medical compound, composed of the ingredients, and substantially in the proportions, herein set forth.

LOUIS KAPPLER.

Witnesses:
J. KIMBERLY,
WM. H. LOTZ.